United States Patent Office 3,265,786
Patented August 9, 1966

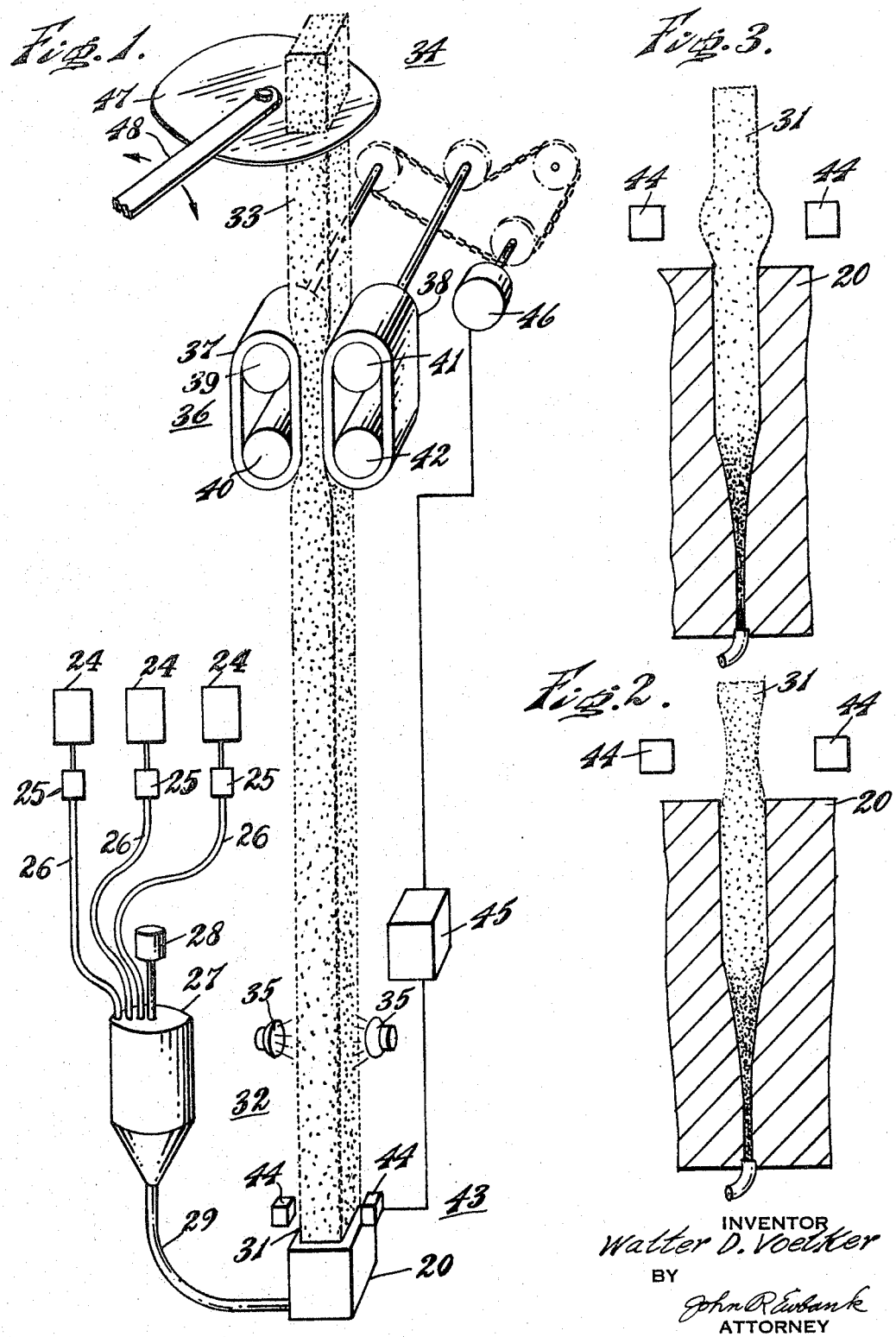

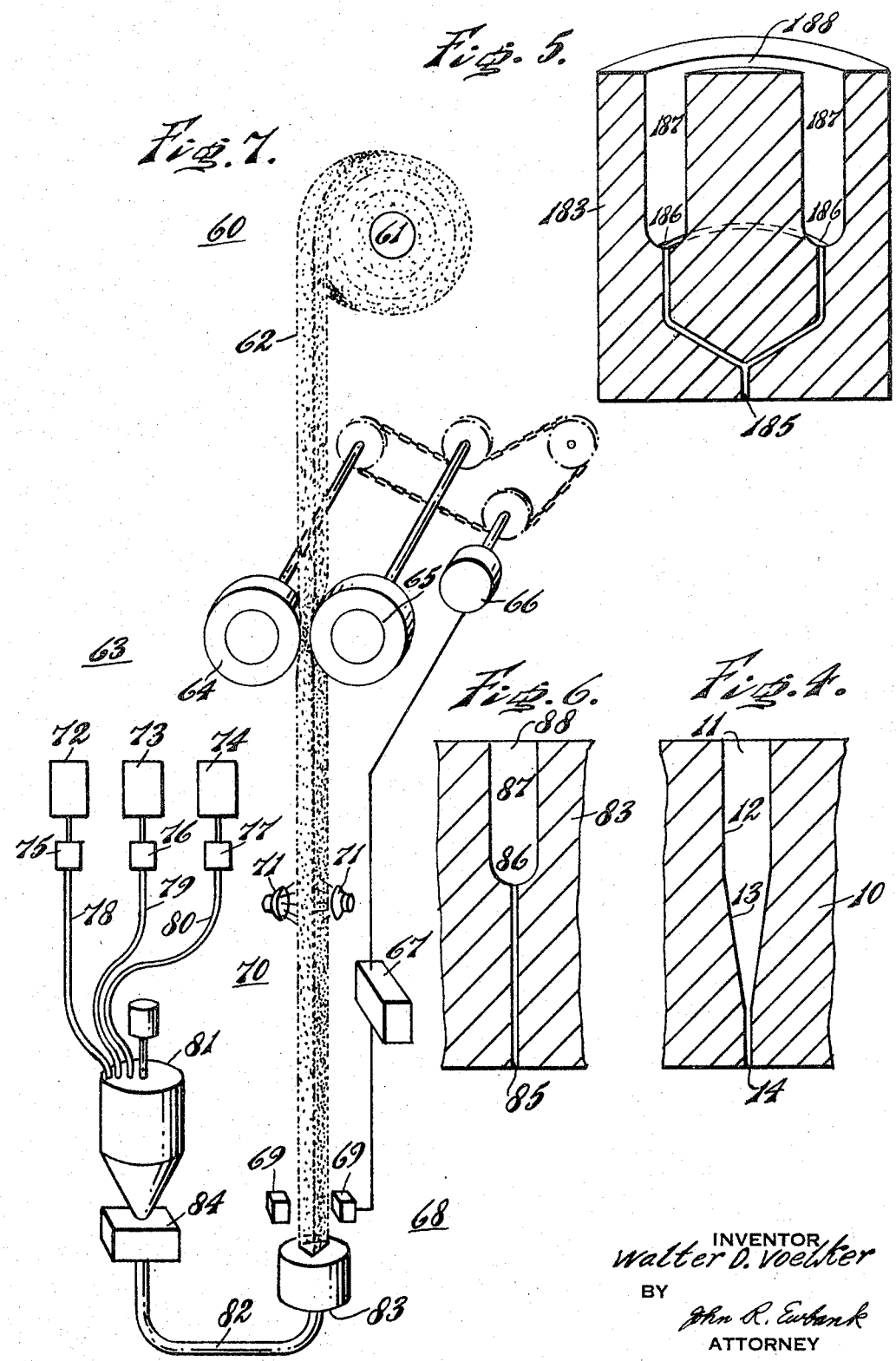

3,265,786
METHOD AND APPARATUS FOR PRODUCING SHAPED POLYURETHANE FOAM STRIP
Walter D. Voelker, Philadelphia, Pa., assignor, by mesne assignments, to Allied Chemical Corporation, New York, N.Y., a corporation of New York
Filed Nov. 23, 1962, Ser. No. 239,616
8 Claims. (Cl. 264—54)

This invention relates to the manufacture of strips of polyurethane foam and is particularly useful in the production of shaped members suitable for replacing extruded strips of foam rubber or rigid cellular plastics.

Heretofore there have been production lines for the manufacture of slabs of polyurethane foam in which the foam forming mixture has expanded upwardly in contact with the air while advancing along a conveyor belt, and the resulting slab has been cut to provide appropriately shaped polyurethane foam strips. Under some conditions relatively large amounts of polyurethane foam scrap have resulted from the cutting operations involved in processing the irregularly shaped loaf produced on the conventional line for polyurethane foam slab into strips having simple rectangular cross sections. It has been more difficult to produce strips having irregular cross sections, and the continuous production of a hollow strip such as tubing, has been virtually impossible.

In accordance with the present invention foam forming composition is introduced into the bottom portion of a shaped vertical opening in a vessel and the reactive mixture undergoes the transformation from the flowable foam forming mixture into a strip of precursor while advancing upwardly through the shaped vessel. Heat is applied to the upwardly moving precursor. Strips of polyurethane foam can be produced having highly irregular cross section, including enclosed voids. As the polyurethane foam strip leaves the upper shaped opening of the vessel, it passes through a monitoring zone and then to a power withdrawal means operated at a speed controlled in part by the monitoring means. A final curing zone is provided for transforming the shaped polyurethane foam strip into a product commercially competitive with other cellular products.

The nature of the invention is further clarified by reference to the accompanying drawings. FIG. 1 is a schematic representation of the present invention. FIG. 2 is a schematic sectional view showing of an adverse condition tending to form a precursor having smaller cross sectional dimensions than desired. FIG. 3 is a schematic showing of an adverse condition tending to form a precursor having cross sectional dimensions larger than desired. FIG. 4 is a schematic cross section view of a shaped vessel suitable for the embodiment of FIG. 1.

FIG. 5 is a schematic showing of a vessel suitable for preparing cylindrical tubing of polyurethane foam from pressurized froth. FIG. 6 is a schematic cross sectional view of a shaped vessel suitable for the embodiment of FIG. 7. FIG. 7 is a schematic showing of an alternative embodiment of the invention.

Referring now in detail to the drawings, there is shown in FIG. 4 a shaped vessel 10 having an open mouth 11 of the cross sectional shape desired in the strip of polyurethane foam. Immediately below the shaped mouth 11 is a shaped portion 12 corresponding to that of the mouth 11. Beneath the strip-shaped portion is a zone 13 of upwardly enlarging area, sometimes conveniently designated as a tapered portion, connecting with a relatively small inlet 14. In the method of the present invention, the foam-forming mixture is supplied through the inlet 14 and undergoes the creaming, rising and foaming transformations in the upwardly enlarging zone 13 and is trnsformed into a strip-shaped precursor in the shaped portion 12, and moves upwardly from the mouth 11. The quantity of precursor strip advancing upwardly from the mouth 11, measured as weight of material per unit time, is substantially equal to the rate at which the foam-forming mixture is supplied to the inelt 14.

Referring now to FIG. 1, there is shown schematically the method of the present invention, characterized by an open mouthed vessel 20 having an open mouth, strip-shaped portion, an upwardly enlarging area zone and a relatively small inlet analogous to those described in connection with FIG. 4. FIG. 1 schematically shows the preparation of rigid polyurethane foam. A suitable formulation for a rigid polyurethane foam is as follows:

Technical grade of nonapropoxysorbitol [1] _____ 100
Polyphenylenepolyisocyante _____ 125
Triethylenediamine catalyst _____ 0.5
Dibutyltindilaurate catalyst _____ 0.1
Silicone surfactant of type soluble in water _____ 1.5
Trichlorofluoromethane _____ 29

[1] Such as tris(tripropyleneether) sorbitol, or other propylene oxide adduct of sorbitol having a molecular weight of the general magnitude of 722, or conveniently designated as propsorb 700.

A plurality of component supply tanks 24, 24, 24 are connected with a mixer 27 through metering pumps 25, 25, 25 and conduits 26, 26, 26. The components are supplied to the mixer 27 in the correct proportions for the desired formulation by reason of the adjustment of the metering pumps 25, 25, 25 and are thoroughly mixed by the mixer 27 driven by motor 28. The foam-forming mixture thus prepared is directed through conduit 29 to the inlet of the shaped vessel 20. The foam-forming mixture moves upwardly through the shaped vessel 20 and is transformed into a precursor 31 which leaves the open mouth of the vessel 20 and moves upwardly through a heating zone 32. Some formulations undergo such an extremely exothermic reaction that only an insulated oven is necessary for rigidizing and imparting significant tensile strength to an advancing strip of rigid polyurethane foam 33 approaching a withdrawal zone 34. Important advantages are achieved because heat is always applied to the strip in the heating zone 32, and such applied heat acelerates the interactions among the components of the foam-forming mixture. The application of heat is indicated schematically by heat lamps 35. Under some conditions it may be desirable to divide the heating zone into a plurality of heating areas, including a heating area subsequent to a power transmission zone 36 in which an upwardly advancing force is imparted to the strip. Such upwardly advancing force is only applied after the strip has developed adequate tensile strength. Any suitable strip advancing apparatus may be employed such as endless belts 37, 38, moving around rollers 39, 40, 41 and 42.

It can be understood that if rollers 39 and 41 are driven at too rapid a speed, the precursor 31, which has only a very small tensile strength, would be pulled apart, and that if the rollers 39, 41 were driven at too slow a speed, the precursor 31 might develop an objectionably high density and/or cross sectional dimensions significantly larger than those of the open mouth of the shaped vessel 20. In order to maintain the cross sectional dimensions of the polyurethane foam strip satisfactorily uniform, a monitoring system 43 is positioned to detect and be responsive to the conditions immediately above the open mouth of the vessel 20. A system of sensing units 44 is adapted to send signals to controller 45, which translates the conditions and sends messages for accelerating and decelerating the supply rate (but not the proportions) of the metering pumps 25, 25, 25 and to accelerate or decelerate the speed of motor 46 driving the rollers 39, 41, controlling the speed of withdrawal of the polyurethane foam strip 33. As shown in FIG. 3, adverse conditions tending to impart to the precursor cross sectional dimensions larger than desired can be detected by sensing units 44 (for example, photo-electric cells focussed on light beams) and thus send signals to the controller 45 to initiate a slight acceleration of the speed of the endless belts 37, 38 in the power transmission zone 36 and/or slow down the supply rate of the foam-forming chemicals sent to the shaped vessel 20. As shown in FIG. 2, the sensing units 44 can detect the development in the precursor 31 of cross sectional dimensions smaller than desired, and signal the slowing down of the motor 46 and/or the acceleration of the supply of foam-forming chemicals to the shaped vessel 20 promptly enough to prevent the pulling apart of the extremely weak precursor at the mouth of the shaped vessel 20.

In the product withdrawal zone 34, a circular saw 47 can be swung on its support 48 to saw off panels of the rigid polyurethane foam to provide a suitable length of the rigid polyurethane foam strip.

As shown in FIG. 7, a flexible foam can be collected in a product withdrawal zone 60 such as by collecting the flexible polyurethane foam on a reel 61. A flexible polyurethane foam strip 62 is pulled upwardly in power transmission zone 63, comprising rollers 64, 65 driven by motor 66, which is regulated by a controller 67 of a monitoring system 68 having sensing units 69 functioning in a manner similarly to that of monitoring system 43. Heating zone 70 may include heating lamps 71 adapted to accelerate the inter-action among the components forming the flexible polyurethane foam. An important difference between the method shown schematically in FIG. 1 and that of FIG. 7 is that the method of FIG. 7 utilizes a foam-forming mixture which should be supplied at a very precise rate. Compositions comprising a prepolymer of polyurethane generally require high pressure flow systems comprising pressure and/or flow regulators, and the schematic showing of FIG. 7 can be interpreted as showing such. Froth formulations also require high pressure flow of the foam-forming mixture, and it is convenient to describe FIG. 7 in relation to froth systems, recognizing its generic application also to prepolymer systems. A normally gaseous component such as difluorodichloromethane can be a part of the frothing system. The diisocyanate can be sent to the mixer separately. A third metering pump can send to the mixer an appropriate mixture of diol, surfactant and catalyst mixture of triethylenediamine and dibutyltindilaurate. The pressurized mixture undergoes expansion in a froth-forming nozzle having a zone of enlarging area maintained at a pressure significantly lower than that at which it entered the nozzle. The components for the froth are sent from supply tanks 72, 73, 74 through metering pumps 75, 76, 77 and conduits 78, 79, 80 to a pressurized mixer 81 and the mixture flows at a controlled pressure through conduit 82 to a shaped vessed 83. A pressure regulator 84 is shown schematically between the mixer 81 and conduit 82 to symbolize the flow at a pressure significantly greater than atmospheric pressure, but any appropriate regulator for high pressure flow may serve as the regulator 84. It is sometimes desirable to employ the controller 67 for maintaining a part of the control of the regulator 84. The froth-forming mixture in conduit 82 is directed through a relatively small inlet 85 of the shaped vessel 83 as shown in FIG. 6. The froth-forming mixture expands rapidly when subjected to atmospheric pressure and/or pressure significantly smaller than that maintained in the pressurized mixer 81, pressure regulator 84, conduit 82 and inlet 85. The froth-forming mixture expands in a zone of upwardly enlarging area 86 and rises through a strip-shaped portion 87 and out through the mouth 88 of the shaped vessel 83.

As shown in FIG. 5, shapes otherwise difficult to achieve, such as hollow cylindrical tubing, may be made of polyurethane foam by the control of the shape of the mouth of the shaped vessel. The shaped vessel 183, may have a relatively small inlet 185, a zone of upwardly enlarging area 186, a strip-shaped portion 187 and an open mouth 188, whereby polyurethane froth is transformed into a precursor having the shape of a cylindrical tube.

Further clarification of the operation of the method of FIG. 7 can be found in the following explanation. Tanks 72, 73, and 74 supply reactive components to metering pumps 75, 76, and 77 respectively which continuously feed the materials to mixer 81. The mixed reactive components are carried through pressure regulator 84 and conduit 82 to the inlet 85 in the bottom section of the shaped vessel 83 in which the reacting materials foam and move progressively upward to the upper opening of the shaped vessel. The foam as it leaves the upper opening of the shaped vessel has some gel strength but is not cured and distorts readily under compression or tension loans. A pair of matched speed power driven rollers 64, 65 pull the foam in an upward direction so that the foam at the upper opening of the shaped vessel is not under any compression or tension load that would impair the shape of the emerging strip. Sensing units 69, 69, each comprising a light source and photo cell, regulate the upward pull on the strip 62 imparted by rollers 64, 65 by regulating the speed of motor 66 through control box 67. The strips of flexible polyurethane foam are collected on reel 61. Heat lamps 71 of the heating zone 70 between the monitoring zone 68 and power transmission zone 63 serve to accelerate the inter-actions among the ingredients to convert the precursor into a strong polyurethane foam.

The illustrative embodiments heretofore described are merely examples of the invention which is defined in the appended claims.

The invention claimed is:

1. A method for continuous production of shaped polyurethane foam strip, which comprises:
    (a) preparing a polyurethane foam-forming composition of flowable consistency;
    (b) continuously directing said composition upwardly through a shaping vessel having a vertically directed passageway of upwardly increasing cross-sectional area passing therethrough, the rate of flow of said composition being adjusted to permit foam formation through reaction of the components thereof during passage of said composition through said passageway and said passageway having a cross-sectional configuration at its outlet corresponding to the desired cross-sectional configuration of the foam strip, whereby a polyurethane foam strip of the desired shape continuously emerges from the shaping vessel;
    (c) heating the foam strip emerging from the shaping vessel to accelerate reaction between the components thereof and thereby develop appreciable tensile strength;
    (d) subsequently applying a driving force to said foam strip to advance it at a rate proportionate to the rate of flow of the foam-forming composition to the shaping vessel so that the cross-sectional configuration of the foam strip emerging from the shaping vessel is maintained substantially the same as that of the passageway at its outlet; and
    (e) continuously collecting the shaped polyurethane foam strip.

2. The method of claim 1 wherein the foam is a rigid polyurethane foam.

3. The method of claim 1 wherein the foam is a flexible polyurethane foam.

4. The method of claim 1 wherein the foam-forming composition entering the shaping vessel is a frothed composition.

5. The method of claim 1 wherein the shaped polyurethane foam strip is in the form of hollow cylindrical tubing.

6. Apparatus for continuously producing shaped polyurethane foam strip, comprising in combination:
    (a) a mixing chamber;

(b) means communicating with said chamber for charging the components of a polyurethane foam-forming composition thereto;

(c) a shaping vessel having a vertically directed passageway of upwardly increasing cross-sectional area passing therethrough, said passageway having a cross-sectional configuration at its outlet corresponding to the desired cross-sectional configuration of the foam strip and said chamber being adapted to permit formation of foam through reaction of the components of said foam-forming composition during its passage through said passageway, whereby the foam strip emerging from the shaping vessel has the desired cross-sectional configuration;

(d) a conduit connecting said mixing chamber with said shaping vessel for passage of the foam-forming composition therebetween;

(e) a heater for applying heat to the foam strip emerging from said shaping vessel;

(f) drive means for applying a driving force to the advancing foam strip subsequent to said application of heat;

(g) sensing means responsive to changes in the cross-sectional dimensions of the foam strip emerging from the shaping vessel for regulating the driving force applied by said drive means, whereby the cross-sectional configuration of the foam strip emerging from the shaping vessel is maintained substantially the same as that of the passageway at its outlet; and (h) means for continuously collecting the shaped polyurethane foam strip.

7. Apparatus as recited in claim 6 wherein said drive means comprises a pair of endless belts arranged to engage and advance the foam strip as it passes therebetween.

8. Apparatus as recited in claim 6 wherein said sensing means comprises at least one photo-electric cell.

References Cited by the Examiner

UNITED STATES PATENTS

| | | | |
|---|---|---|---|
| Re. 24,514 | 8/1958 | Hoppe et al. | 18—48 XR |
| 2,261,022 | 10/1941 | Fox et al. | 18—48 |
| 2,372,162 | 3/1945 | Ryan. | |
| 2,689,374 | 9/1854 | Toulmin | 18—12 |
| 2,827,661 | 3/1958 | Von Kohorn | 18—12 |
| 2,983,962 | 5/1961 | Merz et al. | 264—47 |
| 2,993,233 | 7/1961 | Hoppe et al. | |
| 3,170,972 | 2/1865 | Knipp et al. | 264—209 |

FOREIGN PATENTS 466,629    6/1937    Great Britain.

OTHER REFERENCES

Product Engineering, "Foamed Isocyanates; Formation, Properties; Applications," Feb. 1955, pages 140–143.

Dupont Foam Bulletin, "Void Filling With Frothed Rigid Urethane Foam," Jan. 16, 1961, all pages.

ALEXANDER H. BRODMERKEL, *Primary Examiner.*

P. E. ANDERSON, *Assistant Examiner.*